(12) United States Patent
Le Maner

(10) Patent No.: US 12,472,312 B2
(45) Date of Patent: Nov. 18, 2025

(54) DEVICE FOR DISPENSING A PULVERULENT PRODUCT

(71) Applicant: APTAR FRANCE SAS, Le Neubourg (FR)

(72) Inventor: Francois Le Maner, La Vallee Montaure (FR)

(73) Assignee: APTAR FRANCE SAS, Le Neubourg (FR)

( * ) Notice: Subject to any disclaimer, the term of this patent is extended or adjusted under 35 U.S.C. 154(b) by 572 days.

(21) Appl. No.: 17/795,384

(22) PCT Filed: Jan. 25, 2021

(86) PCT No.: PCT/FR2021/050127
§ 371 (c)(1),
(2) Date: Jul. 26, 2022

(87) PCT Pub. No.: WO2021/152249
PCT Pub. Date: Aug. 5, 2021

(65) Prior Publication Data
US 2023/0115324 A1   Apr. 13, 2023

(30) Foreign Application Priority Data
Jan. 27, 2020   (FR) ...................................... 2000780

(51) Int. Cl.
*A61M 11/00*   (2006.01)
*A61D 7/00*    (2006.01)
*A61M 11/02*   (2006.01)

(52) U.S. Cl.
CPC ............. *A61M 11/007* (2014.02); *A61D 7/00* (2013.01); *A61M 11/02* (2013.01);
(Continued)

(58) Field of Classification Search
CPC ................ A61M 11/007; A61M 11/02; A61M 2202/064; A61M 2205/073;
(Continued)

(56) References Cited

FOREIGN PATENT DOCUMENTS

WO   2009/029028 A1   3/2009
WO   2019/073165 A1   4/2019

OTHER PUBLICATIONS

International Search Report for PCT/FR2021/050127 dated, Jun. 9, 2021 (PCT/ISA/210).
(Continued)

*Primary Examiner* — Christopher S Kim
(74) *Attorney, Agent, or Firm* — Sughrue Mion, PLLC

(57) ABSTRACT

A fluid dispensing device having an air expulsion system (200) with a pump (200) with an external body (210) containing a pump body (220; 270) with a pumping chamber (225) and a piston rod (230). The pump body has a proximal hollow body and a distal hollow body fixed to one another. The rod has a proximal rod part (231), a central rod part (232) and a distal rod part (233), the outside diameter of the central rod part (232) greater than the diameters of the other two. The central rod part supports a first seal (237) and a second seal (236), and the distal rod part supports a third seal (235). The proximal rod part has a central passage (234) extending beyond the first seal and opens laterally to the outside between the first and second seals. The distal hollow body contains a spring.

10 Claims, 5 Drawing Sheets

Figure 1:
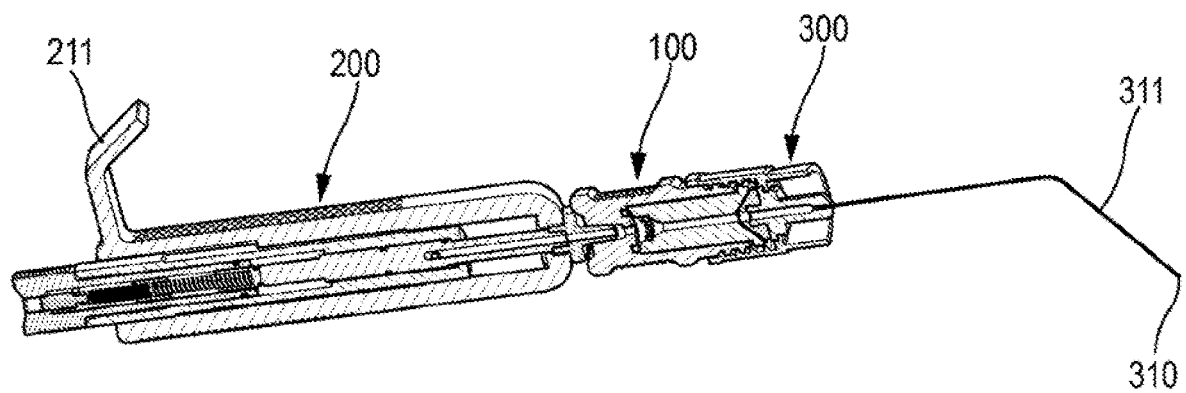

(52) U.S. Cl.
CPC . *A61M 2202/064* (2013.01); *A61M 2205/073* (2013.01); *A61M 2250/00* (2013.01)

(58) Field of Classification Search
CPC .... A61M 2250/00; A61D 7/00; B05B 7/1431; B05B 7/2489; B05B 7/2491; B05B 11/02
USPC ................................................ 239/329, 331
See application file for complete search history.

(56) References Cited

OTHER PUBLICATIONS

International Preliminary Report on Patentability dated Apr. 1, 2022 in Application No. PCT/FR2021/050127.

DEVICE FOR DISPENSING A PULVERULENT PRODUCT

CROSS REFERENCE TO RELATED APPLICATIONS

This application is a National Stage of International Application No. PCT/FR2021/050127 filed Jan. 25, 2021, claiming priority based on French Patent Application No. 2000780 filed Jan. 27, 2020.

The present invention relates to a device for dispensing a pulverulent product, in particular intended for the administration of pharmaceutical product in the form of powder on small animals, such as, for example, rodents, in particular mice.

The devices of the state of the art used to administer doses of powder on small animals, such as rodents, in particular mice, generally comprise a reservoir containing one single dose of powder, associated with a dispensing head on the one hand, and an air expulsion system on the other hand. During actuation, the air expulsion generates a pressurised airflow which enables to expel the dose of powder through the dispensing head, then generally through a cannula intubated in the animal to dispense the powder on its carina of trachea.

These devices generally have disadvantages. Thus, after each actuation, the empty reservoir must be replaced with a full reservoir, which is not practical for the handler, nor economical. A solution to resolve this problem is to provide a reusable reservoir, for example which could easily be filled with another dose of powder and assembled in the device before each actuation.

Another disadvantage relates to the air expulsion, generally done by a syringe containing air. With this type of air expulsion, the pressurised airflow generated during the actuation is dependent on the way in which the user actuates the device, in particular of the force with which they perform its actuation. This does not enable to perform a dispensing reproducible upon each actuation. A solution to resolve this problem is to use a pump adapted to generate a pressurised airflow, the actuation of this pump being independent of the force exerted by the user, in particular of the speed at which they perform this actuation.

Documents WO2019073165 and WO2009029028 describe devices of the state of the art.

The present invention aims to provide a powder dispensing device which does not reproduce the abovementioned disadvantages.

The present invention in particular aims to provide a powder dispensing device which enables to dispense several doses in several successive actuations.

The present invention also aims to provide a powder dispensing device which enables to easily fill the reservoir with a dose of powder before each actuation.

The present invention also aims to provide a powder dispensing device which is simple and reliable to use, with a dispensing reproducible upon each actuation.

The present invention also aims to provide a powder dispensing device which is simple and inexpensive to manufacture and to assemble.

The present invention therefore aims for a fluid product dispensing device comprising a reservoir unit connected on the one hand to an air expulsion system and on the other hand to a dispensing head provided with a dispensing orifice, said air expulsion system comprising a pump comprising an external body which contains a pump body comprising a pumping chamber and in which there is arranged a rod acting as a piston, said rod being fixed with respect to said external body, and said pump body being axially movable to slide around said rod between a rest position and an actuation position, said pump body comprising a proximal hollow body with respect to said dispensing orifice and a distal hollow body with respect to said dispensing orifice which are fixed to one another, said proximal hollow body comprising a proximal pump body part with respect to said dispensing orifice and a distal pump body part with respect to said dispensing orifice of which the inside diameter is greater than that of said proximal pump body part, said rod comprising a proximal rod part with respect to said dispensing orifice, a central rod part and a distal rod part with respect to said dispensing orifice, the outside diameter of said central rod part being greater than the diameters of said proximal and distal rod parts, said central rod part supporting a first seal and a second seal, and said distal rod part supporting a third seal, said proximal rod part comprising a central passage, extending as far as said central rod part beyond said first seal and which opens laterally to the outside of said central rod part between said first and second seals, said distal hollow body containing at least one spring collaborating on the one hand with said distal rod part and on the other hand with said distal hollow body.

Advantageously, said proximal hollow body and said distal hollow body are fixed to one another, in particular by screwing, in a sealed manner with interposition of a body seal.

Advantageously, said distal rod part slides in said distal hollow body, said third seal performing the sealing together during actuation.

Advantageously, said distal hollow body contains two springs axially arranged one behind the other by being connected by a connecting member.

Advantageously, an adjustment element, such as adjustment screw, is arranged in the distal hollow body to form contact with said spring, enabling to modify the actuation force exerted by the spring(s) on said rod during actuation.

Advantageously, said reservoir unit comprises a reservoir having substantially the shape of a hollow cylinder, with a distal opening, a proximal opening and a dosing passage connecting said distal and proximal openings, a one-directional valve being arranged between said dosing passage and said distal opening, said proximal opening of said reservoir forming a filling cone to facilitate the filling of said dosing passage with a dose of powder.

Advantageously, said one-directional valve is of the split membrane type which only opens in one single direction under the effect of a predetermined pressure.

Advantageously, said dispensing head comprises a dispensing member provided with said dispensing orifice.

Advantageously, said dispensing member comprises a needle.

Advantageously, said needle is curved or bent.

Figure 2:
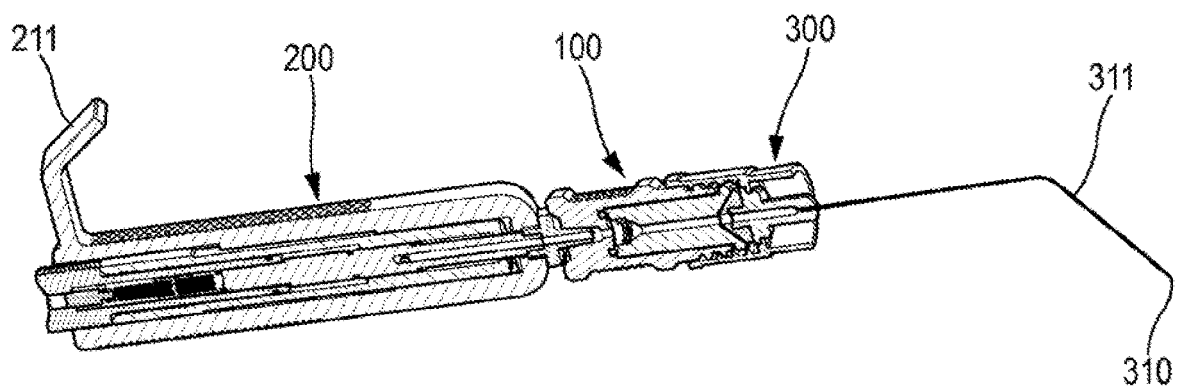
Figure 3:
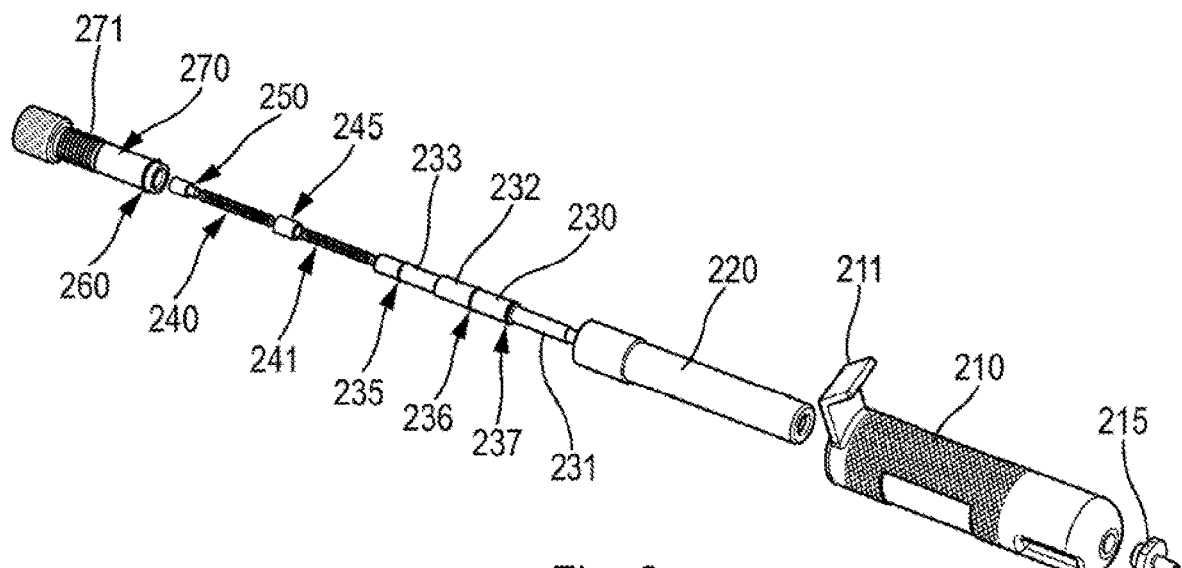
Figure 4:
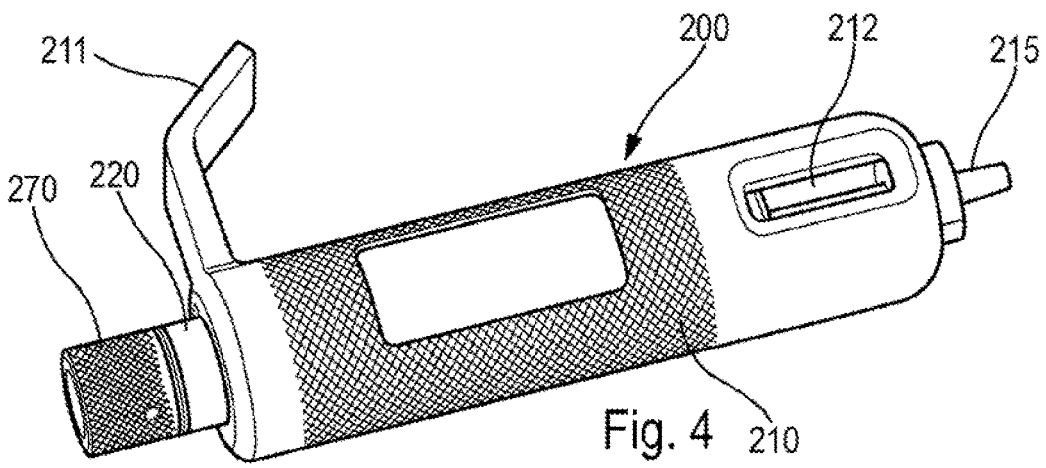
Figure 5:
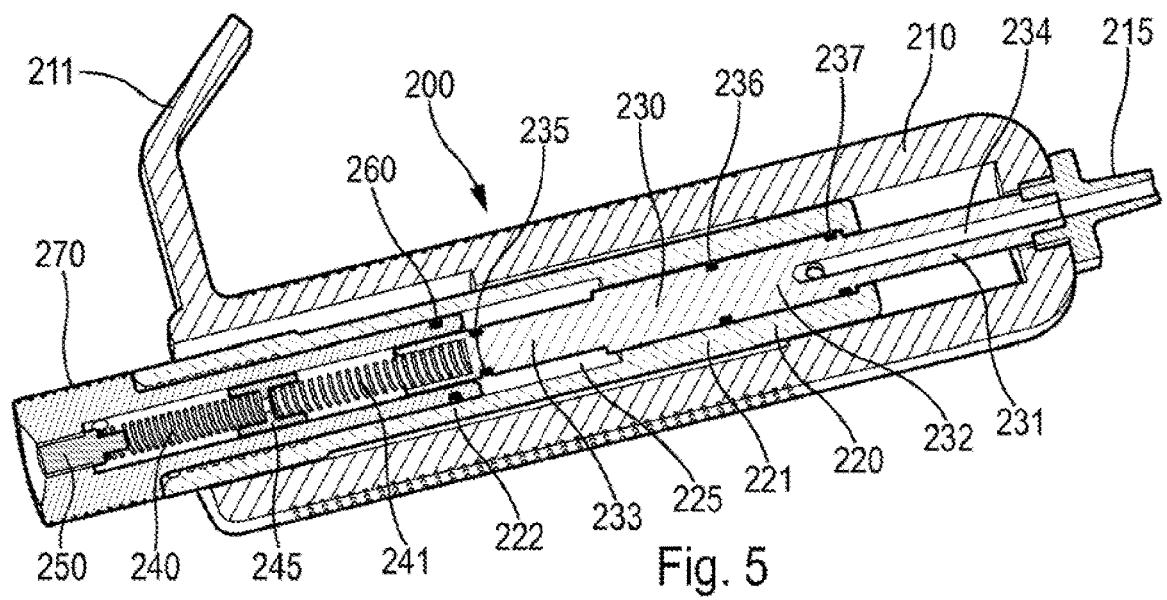
Figure 6:
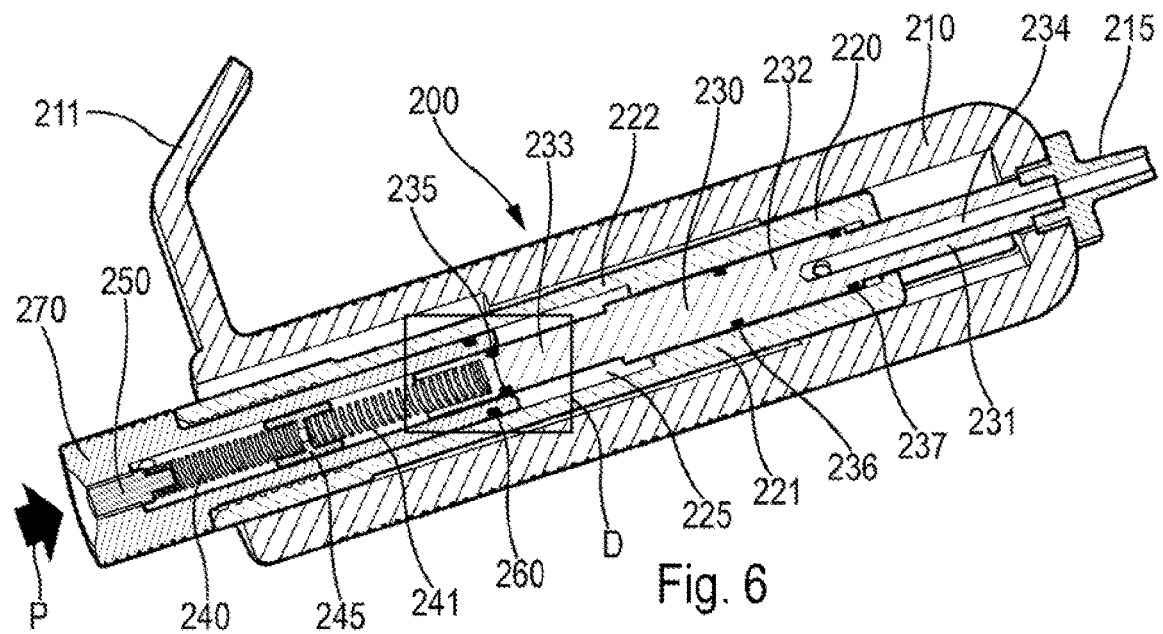
Figure 9:
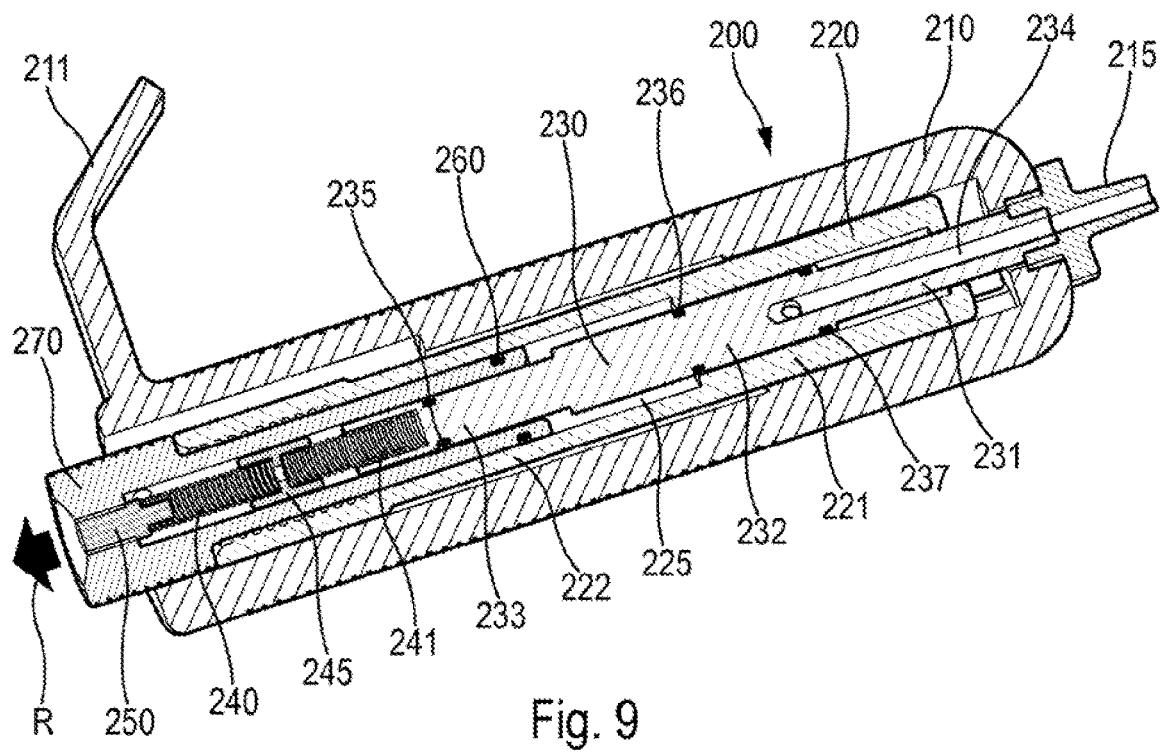
Figure 10:
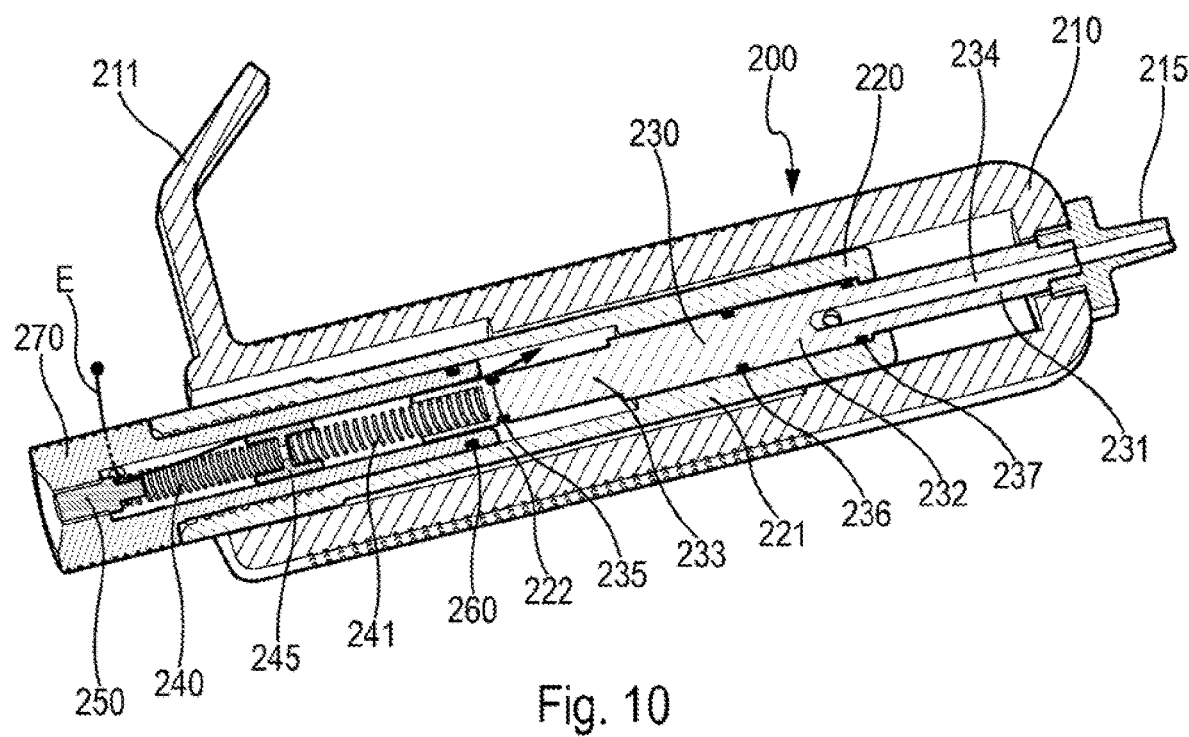
Figure 11:
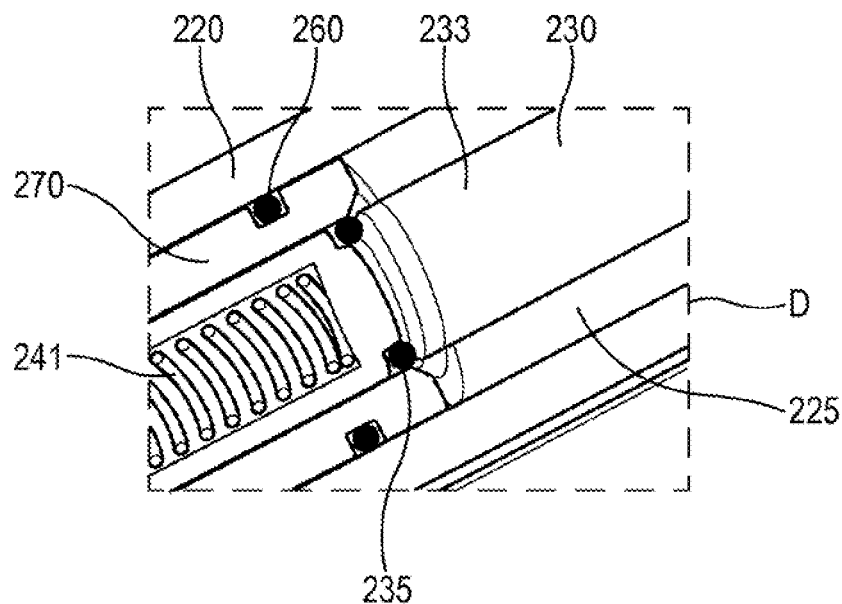
Figure 12:
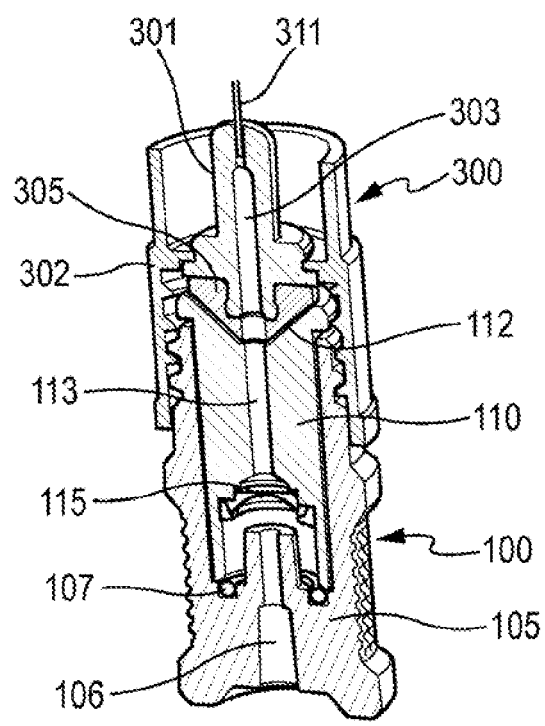
Figure 13:
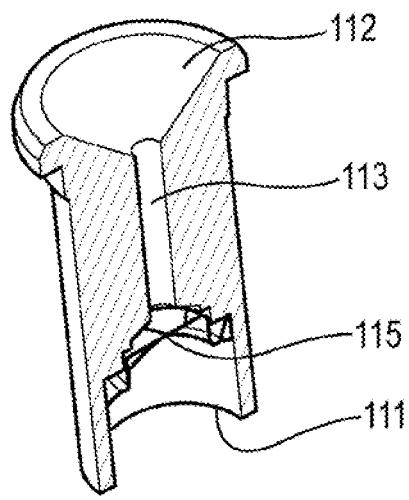

These characteristics and advantages and others of the present invention appear more clearly from the following detailed description, given by way of non-limiting example, and which reference to the accompanying drawings, and in which:

FIG. 1 is a cross-sectional, perspective, schematic view of a powder dispensing device according to an advantageous embodiment, in position before actuation, FIG. 2 is a view similar to the view in FIG. 1, shown after actuation, FIG. 3 is an exploded, perspective view of an air expulsion system according to an advantageous embodiment, FIG. 4 is a side, perspective view of the air expulsion system of FIG. 3, FIGS. 5 to 10 are cross-sectional, perspective views of the air expulsion system of FIG. 3, showing the different steps of an actuation cycle of said air expulsion system, FIG. 11 is a larger-scale view of a detail D of FIG. 6, FIG. 12 is a cross-sectional, perspective view of a reservoir and dispensing head assembly, according to an advantageous embodiment, and FIG. 13 is a detailed view of the reservoir of FIG. 12.

The terms "proximal" and "distal" are relative to the dispensing orifice. The terms "upstream" and "downstream" refer to the flow direction of the fluid product during its dispensing. The terms "axial" and "radial" are relative to the longitudinal central axis of the device.

The fluid product dispensing device represented in the figures comprises a reservoir unit 100 which could contain a dose of pulverulent product, connected on the one side to an air expulsion system 200 and on the other side to a dispensing head 300 provided with a dispensing orifice 310.

The reservoir unit 100, more particularly visible in FIGS. 12 and 13, comprises a reservoir 110 having substantially the shape of a hollow cylinder, with a distal opening 111, a proximal opening 112 and a dosing passage 113 connecting said two distal and proximal openings 111, 112. A one-directional valve 115 is arranged between said dosing passage 113 and said distal opening 111.

Thus, when the reservoir 110 is filled with a dose of powder through the proximal opening 112, this dose of powder remains in the dosing passage 113, the one-directional valve 115 preventing it from exiting through the distal opening 111. When the air expulsion system 200 is actuated, a pressurised airflow is sent into the reservoir 110 through said distal opening 111, causing the opening of the one-directional valve 115 and the expulsion of the dose of powder through the proximal opening 112.

The reservoir 110 is preferably fixed in a cylindrical body 105 comprising a central passage 106 enabling to connect the air expulsion system 200 with the reservoir 110.

As visible in FIG. 13, the proximal opening 112 of the reservoir 110 forms a filling cone to facilitate the filling of the dosing passage 113 with the dose of powder. Indeed, the doses intended for small animals, such as rodents, are generally very small, typically of around a few mm$^3$. Advantageously, it is the volume of the dosing passage 113 which defines the volume of the dose of powder dispensed upon each actuation. This elongated tubular shape extended of the dosing passage 113 enables in particular to limit the risks of agglomeration of the powder.

The reservoir 110 is advantageously fixed in the cylindrical body 105 with interposition of a seal 107.

The one-directional valve 115 can be of the split membrane type which only opens in one single direction under the effect of a predetermined pressure. Other implementations, for example a ball, are possible.

Such a reservoir unit 100 in particular enables to easily perform a sterilisation in an autoclave.

Advantageously, the reservoir 110 is made of metal, in particular, made of stainless steel. This enables to avoid the use of plastic materials in the expulsion path of the powder. The cylindrical body 105 can also be made of metal, in particular made of stainless steel. In this way, the reservoir unit 100 can easily be connected to the ground to avoid or limit static electricity phenomena.

The dispensing head 300 comprises a hollow body 301 fixed to the reservoir unit 100 by a fixing ring 302.

The fixing ring 302 is fixed on the cylindrical body 105 of the reservoir unit 100, for example by screwing, snap-fitting or crimping. Any other fixing means is possible.

The hollow body 301 comprises a central axial passage 303, connected on a side to the proximal opening 112 of the reservoir 110 and on the other side to a dispensing member 311 provided with a dispensing orifice 310. In the example represented, the dispensing member 311 comprises a needle, which can be curved or bent. In a variant, a dispensing member enabling to deliver an aerosol could be considered.

Advantageously, a hollow stopper 305 is interposed between the reservoir 110 and the hollow body 301, said hollow stopper 305 having a conical shape adapted to the shape of the proximal opening 112 of the reservoir 110. This hollow stopper 305 enables to ensure a good connection between the reservoir 110 and the hollow body 301, in particular a sufficient sealing to avoid any loss of dose during the dispensing of a dose of powder.

The air expulsion system 200 can be, in a known manner, an air-filled syringe, the actuation of the piston generating a pressurised airflow.

Preferably, however, the air expulsion system 200 comprises a pump, of which the actuation is independent of the actuation force exerted by the user. Thus, the pressurised airflow generated upon each actuation is always identical and reproducible from one actuation to the other.

An advantageous example of the air expulsion system 200 will now be described in more detail in reference to FIGS. 1 to 11.

In this example, the air expulsion is formed by a pump 200 comprising an external body 210 provided with a handle 211 and a dispensing nozzle 215. The external body 210 contains a pump body comprising a pumping chamber 225, and in which there is arranged a rod 230 acting as a piston. The rod 230 is fixed with respect to the external body 210, and the pump body is axially movable to slide around said rod 230 between a rest position and an actuation position.

The pump body comprises a proximal hollow body 220 and a distal hollow body 270, which are fixed to one another, in particular by screwing. A body seal 260 is provided between the proximal and distal hollow bodies to ensure a sealing fixing to one another. The proximal hollow body 220 comprises a proximal pump body part 221 and a distal pump body part 222 of which the inside diameter is greater than that of said proximal pump body part 221. The distal hollow body 270 extends at least partially in the proximal hollow body 220.

Said rod 230 comprises a proximal rod part 231, a central rod part 232 and a distal rod part 233. The outside diameter of said central rod part 232 is greater than the diameters of the proximal 231 and distal 233 rod parts. The central rod part 232 supports a first seal 237 and a second seal 236, and the distal rod part 233 supports a third seal 235. The proximal rod part 231 comprises a central passage 234 which extends from the dispensing nozzle 215 into the central rod part 232 beyond said first seal 237 and which opens laterally to the outside of said central rod part 232 between said first and second seals 237, 236. The distal rod part 233 slides in said distal hollow body 270, said third seal 235 performing the sealing therebetween.

The distal hollow body 270 contains at least one spring 240, 241 collaborating on the one hand with the distal rod part 233 and on the other hand with the distal hollow body 270. In the example represented in the drawings, there are two springs 240, 241 arranged axially behind one another by being connected by a connecting member 245. Naturally, one single spring can be considered.

Possibly, an adjustment element 250, such as an adjustment screw, can be arranged in the distal hollow body 270 to form the contact with the spring 240. This adjustment element 250 thus enables to easily modify the actuation force exerted by the spring(s) on the rod 230 during the actuation.

FIGS. 5 to 10 illustrate an advantageous actuation cycle of this air pump.

In the rest position, represented in FIG. 5, the pump body is urged axially towards the outside of the external body 210 by the springs 240, 241, the first and second seal 237, 236 collaborate in a sealed manner with the proximal pump body part 221 of the proximal hollow body 220. The dosing chamber 225 is therefore isolated from the dispensing nozzle. The third seal 235 is arranged outside of the distal hollow body 270, such that the dosing chamber 225 is open to the atmosphere via the distal hollow body 270.

When the user exerts an axial thrust force on the distal hollow body 270, as illustrated by the arrow P in FIG. 6, the pump body, formed by the proximal hollow body 220 and the distal hollow body 270, slides axially towards the inside of the external body 210, around the rod 230. As can be better seen in FIG. 11, the third seal 235 thus collaborates in a sealed manner with the internal surface of the distal hollow body 270, to thus isolate the dosing chamber 225 from the atmosphere.

Figure 7:
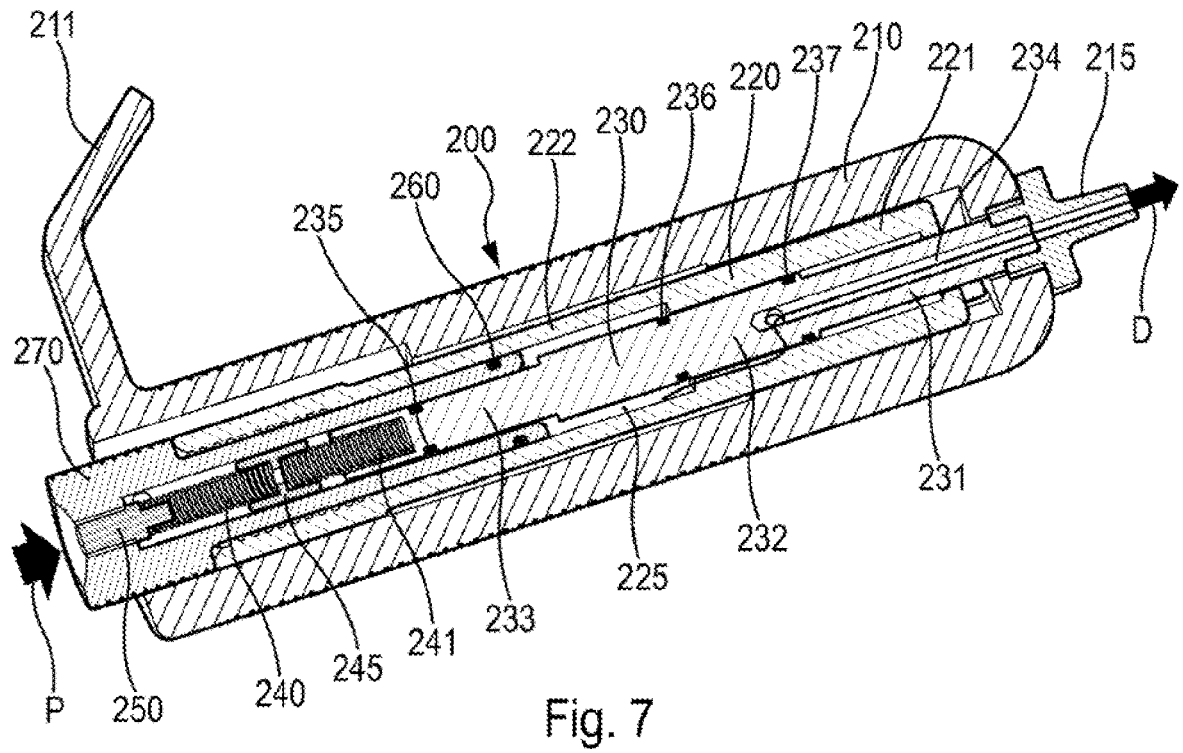

A continuation of the axial thrust force P such as illustrated in FIG. 7 thus causes the compression of air in the dosing chamber 225, under the effect of the central rod part 232 of a larger diameter which progressively penetrates into the dosing chamber 225. When the seal seal 236 reaches the distal pump body part 222 of a greater diameter and ceases to collaborate in a sealed manner with the proximal pump body part 221, the compressed air contained in the dosing chamber 225 can escape around the central rod part 232 to the central passage 234 then to the dispensing nozzle 215, as illustrated by the arrow D in FIG. 7.

Figure 8:
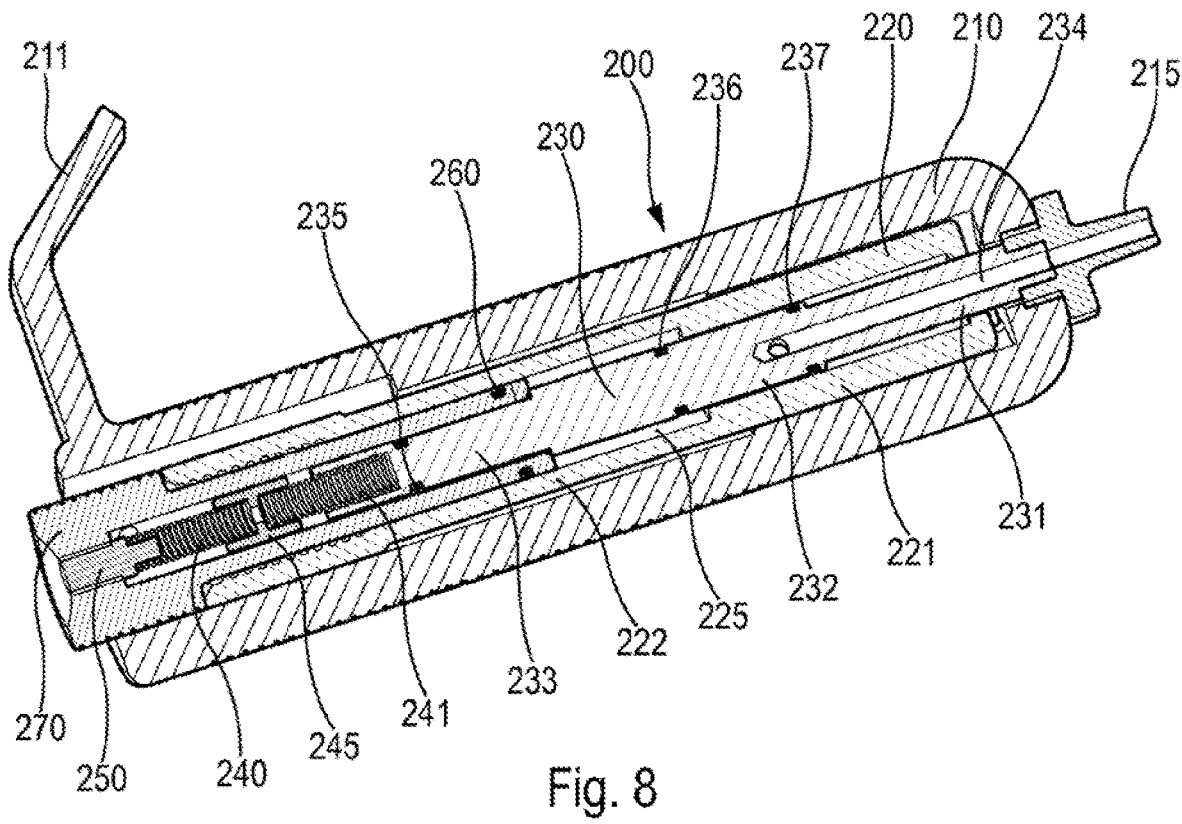

FIG. 8 shows the position at the end of the actuation stroke, after expulsion of the compressed air contained in the dosing chamber 225. In this position, the proximal axial end of the distal hollow body 270 abuts against the shoulder formed between the distal rod part 233 and the central rod part 232. This mechanical abutment of the actuation stroke of the pump ensures an actuation independent of the force exerted by the user.

When the user relaxes their pressure on the pump body, the spring 240, 241 which has been compressed during the actuation stroke, expands, which returns the pump body to its rest position, as illustrated by the arrow R in FIG. 9. As soon as the second seal 236 again collaborates in a sealed manner with the central rod part 232, the dosing chamber 225 is again isolated from the dispensing nozzle 215, such that there is no other risk of re-suctioning of fluid product or air from the treated animal, despite the depression which is created in the dosing chamber 225 during the return stroke.

As soon as the third seal 235 ceases its sealed collaboration with the internal surface of the distal hollow body 270, the dosing chamber 225 again opens towards the atmosphere generating a venting flow through the distal hollow body 270, represented by the arrow E in FIG. 10.

The pump is thus ready for another use.

Although the present invention is described above with reference to an advantageous embodiment, naturally various modifications can be applied thereto by the person skilled in the art, without going beyond the scope of the present invention, as defined by the accompanying claims.

The invention claimed is:

1. A device for dispensing fluid product comprising a reservoir unit connected to an air expulsion system and to a dispensing head provided with a dispensing orifice, wherein said air expulsion system comprises a pump comprising an external body which contains a pump body comprising a pumping chamber, said pump body receiving a rod acting as a piston, said rod being fixed with respect to said external body, and said pump body configure to slide on said rod between a rest position and an actuation position, said pump body comprising a proximal hollow body with respect to said dispensing orifice and a distal hollow body with respect to said dispensing orifice fixed to one another, said proximal hollow body comprising a proximal pump body part with respect to said dispensing orifice and a distal pump body part with respect to said dispensing orifice of which an inside diameter is greater than an inside diameter of said proximal pump body part, said rod comprising a proximal rod part with respect to said dispensing orifice, a central rod part and a distal rod part with respect to said dispensing orifice, an outside diameter of said central rod part being greater than outside diameters of said proximal and distal rod parts, said central rod part supporting a first seal and a second seal, and said distal rod part supporting a third seal, said proximal rod part comprising a central passage extending as far as said central rod part beyond said first seal and which opens laterally outside of said central rod part between said first and second seals, said distal hollow body containing at least one spring collaborating with said distal rod part and with said distal hollow body.

2. The device according to claim 1, wherein said proximal hollow body and said distal hollow body are fixed to one another in a sealed manner with interposition of a body seal.

3. The device according to claim 1, wherein said distal rod part slides in said distal hollow body, said third seal performing sealing therebetween during actuation.

4. The device according to claim 1, wherein said at least one spring contained in said distal hollow body are two springs arranged behind one another by being connected by a connecting member.

5. The device according to claim 1, wherein an adjustment element is arranged in the distal hollow body to make contact with said spring, enabling modification of an actuation force exerted by said at least one spring on said rod during actuation.

6. The device according to claim 1, wherein said reservoir unit comprises a reservoir having substantially a shape of a hollow cylinder, with a distal opening relative to said dispensing orifice, a proximal opening relative to said dispensing orifice and a dosing passage connecting said distal and proximal openings, a one-directional valve being arranged between said dosing passage and distal opening, said proximal opening of said reservoir forming a filling cone to facilitate filling of said dosing passage with a dose of powder.

7. The device according to claim 6, wherein said one-directional valve is a split membrane that only opens in a single direction under an effect of a predetermined pressure.

8. The device according to claim 1, wherein said dispensing head comprises a dispensing member provided with said dispensing orifice.

9. The device according to claim 8, wherein said dispensing member comprises a needle.

10. The device according to claim 9, wherein said needle is curved or bent.

* * * * *